United States Patent [19]
Lager et al.

[11] Patent Number: 5,343,611
[45] Date of Patent: Sep. 6, 1994

[54] METHOD AND A FIXTURE SYSTEM FOR POSITIONING AND FIXING DETAILS FOR ASSEMBLY

[76] Inventors: Göran Lager, Toftvägen 20, Borlänge S-781 32; Nils Eriksson, Moje 106, Gagnef S-780 41, both of Sweden

[21] Appl. No.: 50,063
[22] PCT Filed: Nov. 14, 1990
[86] PCT No.: PCT/SE90/00735
  § 371 Date: May 10, 1993
  § 102(e) Date: May 10, 1993
[87] PCT Pub. No.: WO92/08572
  PCT Pub. Date: May 29, 1992

[51] Int. Cl.⁵ .............................. B23Q 7/00
[52] U.S. Cl. ............................ 29/559; 269/69; 269/88; 269/303; 269/900
[58] Field of Search ............. 409/219, 220, 221, 218, 409/225; 269/63, 69, 303, 305, 45, 88, 900; 29/464, 559

[56] References Cited

U.S. PATENT DOCUMENTS

| | | |
|---|---|---|
| 4,121,817 | 10/1978 | Pavlovsky . |
| 4,157,819 | 6/1979 | Meyer . |
| 4,383,681 | 5/1983 | Walters ......................... 269/69 |
| 4,753,425 | 6/1988 | Yang ............................ 269/88 |
| 4,771,980 | 9/1988 | Dubbs et al. .................. 269/69 |
| 4,794,687 | 1/1989 | Peters et al. ................. 269/900 |
| 4,837,994 | 6/1989 | Johnsen ........................ 248/669 |
| 4,949,944 | 8/1990 | Graff ............................ 269/45 |
| 5,107,599 | 4/1992 | Marincic et al. ............. 269/900 |

FOREIGN PATENT DOCUMENTS

| | | |
|---|---|---|
| 0214785 | 12/1989 | European Pat. Off. . |
| 750864 | 1/1945 | Fed. Rep. of Germany . |
| 2458160 | 6/1976 | Fed. Rep. of Germany . |
| 3329988 | 2/1985 | Fed. Rep. of Germany ........ 269/69 |
| 3400271 | 7/1985 | Fed. Rep. of Germany . |
| WO8707198 | 12/1987 | PCT Int'l Appl. . |
| 398312 | 12/1977 | Sweden . |
| 417923 | 4/1981 | Sweden . |
| 8501791-1 | 4/1985 | Sweden . |
| 446525 | 9/1986 | Sweden . |
| 447217 | 11/1986 | Sweden . |
| 1529642 | 10/1978 | United Kingdom . |
| 1551203 | 8/1979 | United Kingdom . |
| 2118480 | 11/1983 | United Kingdom . |

*Primary Examiner*—Robert C. Watson
*Attorney, Agent, or Firm*—Young & Thompson

[57] ABSTRACT

The present invention relates to a method and a fixture system for providing a fixture for the positioning and clamping of details to be assembled, preferably by welding. According to the method drawing information for the assembled product is provided in a computer program, a zero position on the product is established, an installation plan for the fixture to be built is provided by determining support positions in a system of coordinates, for the fixture relative to the product, based on the drawing information and starting from the zero position on the product, and the fixture is built up according to the established installation plan and from standard fixture components (1, 5, 7, 14) selectively interconnectable by means of hole systems (2, 6, 18, 15) extendable along the X-, Y- and/or Z-axes of the coordinate system.

19 Claims, 3 Drawing Sheets

METHOD AND A FIXTURE SYSTEM FOR POSITIONING AND FIXING DETAILS FOR ASSEMBLY

The present invention generally relates to a method and a fixture system for positioning and fixing/clamping details to be assembled, and specifically but not exclusively relates to such a method and fixture system for welding assembly.

It is a well-known fact that welding companies encounter severe problems, incur costs and lose much valuable time in connection with positioning and clamping operations during welding assembly, all caused by the fact that there are no adjustable fixture systems with surrounding equipment available on the market.

This means that such companies suffer from severe problems such as long set-up times, inferior precision, inferior repetitive accuracy, high fixture costs, long door-to-door times with the resulting binding of a great amount of capital, low flexibility, high degree of difficulty in re-setting and problems in connection with recruiting the staff due to the degree of difficulty of the work.

Said problems are due to the fact that such welding companies have up to now been reduced to using either of the following systems:

Primitive systems of a disposable nature which involve relatively low costs but suffer from inferior qualities when it comes to precision, repetitive accuracy, set-up times, working environment and require a highly skilled staff. The fixtures are often built up directly on a floor and often consist of material accessible for the moment, such as loose beams, scrap boxes and so forth.

Complex systems, mostly of a disposable nature, where extensive design work has been carried out prior to a time consuming fixture manufacturing process, which results in heavy costs for the fixtures which are also mostly not adjustable. Positive qualities regarding precision, repetitive accuracy and simplicity as regards the set-up work do not compensate for the high manufacturing costs.

The above described problems mean that with the present state of the art there are no fixture systems available which may be justified from the view point of business economics and which at the same time provide the required quality or standard regarding precision, repetitive accuracy and other quality parameters. Moreover, said problems mean that no fixture systems are available which permit short set-up times, short door-to-door times, high flexibility and simplicity for the set-up work, in combination with the requirements for precision, repetitive accuracy and manufacturing costs.

The lack of adequate fixture systems means that the CAD/CAM technique cannot be fully employed in design, preparation for manufacturing, manufacturing and inspection, which is a necessity for the companies that are to be competitive in the future.

The object of the present invention is therefore to provide a method and a fixture system for positioning and clamping details to be assembled, specifically but not exclusively for welding assembly, which provide i.a. optimum flexibility, short set-up times, low fixture costs, high repetitive accuracy and minimum cassation due to high accuracy, and which may be employed for production in long or short series.

Said general object of the invention is achieved by means of a method and a fixture system having the characteristic features of claims 1 and 3 respectively.

Other specific objects of the invention is to provide such a method and fixture system being adapted for the CAD/CAM technique, to provide a fixture system permitting selective extension and adjustment not only along X- and Y-axis but also along a Z-axis and to provide such a fixture System specifically adapted for welding assembly. The subclaims are directed to embodiments of the invention developed for achieving said further objects.

Other objects, features and advantages of the present invention will be more readily apparent from the following detailed description read in conjunction with the accompanying drawings, in which:

FIG. 1 illustrates an embodiment of a welding fixture system built up in accordance with the principles of the present invention, with parts of the system illustrated in a partially disassembled condition for reasons of explanation, FIG. 2 illustrates a basic beam included in the system of FIG. 1, FIG. 3 illustrates a jointing sleeve for interconnecting the basic beams longitudinally, FIG. 4 illustrates a connecting sleeve for interconnecting the basic beams transversely, FIG. 5 illustrates a first fixture means for mounting in the hole system of the fixture, FIG. 6 illustrates a second fixture means intended for attachment to the first fixture detail of FIG. 5, FIG. 7 illustrates a third fixture means intended for the attachment of further fixture means, FIG. 8 illustrates a bridging plate with its hole system, and FIG. 9 illustrates a clamping unit for clamping the details to be welded.

Although the present invention will be described with specific reference to a fixture for welding assembly it should be pointed out that the invention is not restricted to welding fixtures but may likewise be applicable for other assembly work.

The method according to the invention is based on a completely new way of attacking or approaching the above discussed problems encountered when constructing and producing a fixture in accordance with the present state of the art. Basically this means that according to the invention the design work, the preparation for construction, the building-up of the fixture and the welding operation have been integrated. More specifically this means that when initiating the design or construction of the fixture, drawing information either in a computer program or from a construction drawing, is provided for the finished product to be assembled, said drawing information forming the base for the design or construction of the fixture. Next, a zero position is established on the product and an installation plan for the fixture is provided by determining, by means of the drawing information, support positions for the fixture relative to the product, in a system of coordinates and starting from the zero position on the product. Finally the fixture is built up, based on the installation plan, from selectively, by means of hole systems, interconnectable standard fixture components.

This means that the fixture is designed or built up based on the geometry of the detail or product, given in the drawing information, which in turn means that the time consuming work of manufacturing a prototype for the construction of the fixture may be eliminated, this resulting in a further lowering of the costs.

As indicated above the method according to the invention may be employed by manual as well as by computer-aided design, and it is apparent that the advantages of the invention are further emphasized in connection with computer;aided design, where the drawing information is stored in a CAD computer program, all of the standard components of the fixture systems are stored in the CAD computer program and the fixture installation plan is established in the CAD computer program, based on the drawing information and fixture standard components stored therein. The fixture is then built up on the basis of the fixture installation plan, directly from the screen or from a print-out. The fixture installation plan includes a listing of the components of the fixture and their geometrical positions in the coordinate system. Every fixture component is positioned relative to the zero position and in its specified position relative to the X-, Y- and/or Z-axis.

In this connection is should be pointed out that although the drawings do not specifically illustrate the possibility of extending the fixture in the Z-axis direction it should be obvious that the fixture may without any additional problem be extended also in said Z-direction, at least in connection with a computer-aided design.

The fixture system provided in accordance with the invention and schematically illustrated in the drawings is adapted for the above described method employed in connection with manual and/or computer-aided design and production preparation, and is based on the principle of automatically positioning the product to be welded in a fixture system which by means of standard fixture components may be built up already at the design and preparation stage. The fixture is based on the principle of providing hole systems selectively extendable in the X-, Y- and Z-directions, providing precise positions for positioning, supporting and clamping means by employing standard components which may be interconnected by easy manipulation. As discussed above the method according to the invention provides for an installation plan specifying the standard components employed for the specific fixture for positioning and clamping the product, and the exact positions for the fixture components in the fixture. In this manner the welding operator may, based on the production information, easily and quickly build up a welding assembly fixture of high quality and to a low cost, which fixture guarantees a high dimensional accuracy as well as repetitive accuracy.

FIG. 1 illustrates the principles for building up a fixture system according to the invention, and specifically illustrates that the fixture system basically consists of basic or support beams 1 which may be interconnected longitudinally by means of jointing sleeves 5 and transversely by means of connecting sleeves 7. Although not illustrated in the drawings it should be understood that the fixture may be extended not only in the X- and Y-axis directions but also in the Z-axis direction, whereby the extension in the Z-axis direction is achieved by attaching a coupling sleeve 7 to one of the sides of a basic beam 1 lying in the plane of the drawing.

FIG. 1 also illustrates how a bridging plate 14 may be attached to the basic beams 1. With reference to FIGS. 1, 2, 3, 4 and 8 it is also clear that the basic beams 1 are provided with hole systems 2 of equidistantly spaced holes arranged in aligned rows, preferably on each side of the basic beams 1, and that the jointing sleeves 5, connecting sleeves 7 and bridging plates 14 are likewise provided with mounting holes 6, 8 and 15 respectively with the same mutual distance therebetween as for the holes in the hole system 2 of the basic beams 1. Likewise, the holes 2, 6, 8 and 15 are provided such in the respective member that when interconnecting the different members said holes 2, 6, 8 and 15 form a complete hole system extended in the X-, Y- and Z-axis directions and all being equidistantly spaced from each other, i.e. having predetermined, specific positions relative to each other in a coordinate system. This means that the complete fixture may be assembled with all of the included members being positioned in predetermined, exact positions.

FIG. 1 furthermore illustrates how the first and second fixture members 9 and 11 respectively may be mounted in the hole system 2 of the basic beams 1. Likewise it is illustrated that said fixture members may be mounted in the holes 15 of the bridging plate 14 forming an attachment surface therefore. Thus, FIG. 1 illustrates an example of how the basic beams 1, jointing sleeves 5, connecting sleeves 7, first and second fixture members 9 and 11 respectively and bridging plates 14 may be attached relative to each other, whereby expansion-shell bolts 16 are employed for interconnecting the members when they have all been assembled. The use of expansion-shell bolts 16 is specifically important in connection with welding fixtures where threaded bolts and the like may not be used since weld metal may otherwise block the threads. In the embodiment intended for welding assembly the fixture components should also be manufactured from a material suitable for this environment, such as aluminum treated in an aluminite process (eloxated aluminum).

FIG. 2 illustrates in detail a preferred embodiment of a basic beam 1 with its hole system 2, position markings 3 and with such a cross-section profile that it serves as a guide 4 for the first fixture means 9. Obviously, the basic beams 1 may be provided with different cross-section shapes, as long as they are interconnectable. In the illustrated embodiment the hole system 2 consists of one row of aligned holes in each side of the basic beams 1, but it does naturally lie within the scope of the invention to provide holes in only some side(s) of the beams 1 or to provide hole systems 2 consisting of two or more aligned rows of holes in each side. As mentioned above the basic beams 1 may be surface-treated so as to prevent weld metal from burning-in and sticking to the basic beams. For the welding application the basic beams may also advantageously be constructed as electrically conducting profiles.

FIG. 3 illustrates a jointing sleeve 5 intended for the longitudinal jointing of basic beams 1. FIG. 3 also illustrates the provision of mounting holes 6 in the jointing sleeve 5, corresponding to the hole system 2 of the basic beams 1, as explained above.

FIG. 4 illustrates a connecting sleeve 7 with its mounting holes 8, intended for interconnecting the basic beams in a transversal direction, i.e. for positioning on either of the four sides of the basic beams 1.

FIG. 5 illustrates a first fixture means 9 intended to serve as a support for the second fixture means 11 illustrated in FIG. 6 or directly as a supporting plane for details to be welded. The second fixture means 11 illustrated in FIG. 6 is provided with slits 12 allowing for stepless movement of the second fixture member 11 in relation to the first fixture member 9 before final attachment of the expansion-shell bolts 16, thereby allowing for a stepless or infinitely variable adjustment of position of the second fixture member 11. In order to perform an adjustment of the second fixture 11 to an exact, predetermined position the first fixture member 9 is provided with a scale 10 where the position of the second fixture means 11 in relation to the first fixture means 9 may be read. The second fixture means 11 is in itself intended for positioning details, such as details to be welded, for the attachment of further fixture means and for permitting the above discussed variable position adjustment.

With reference to the above discussion it will now be apparent that the fixture means may be positioned anywhere in the hole system 2 of the basic beams 1 (and in the bridging plates), which are positioned and interconnected in such a manner that the rows of the holes 2 therein form X-, Y- and/or Z-axis in a coordinate system in which all holes have fixed positions.

Figure 1:
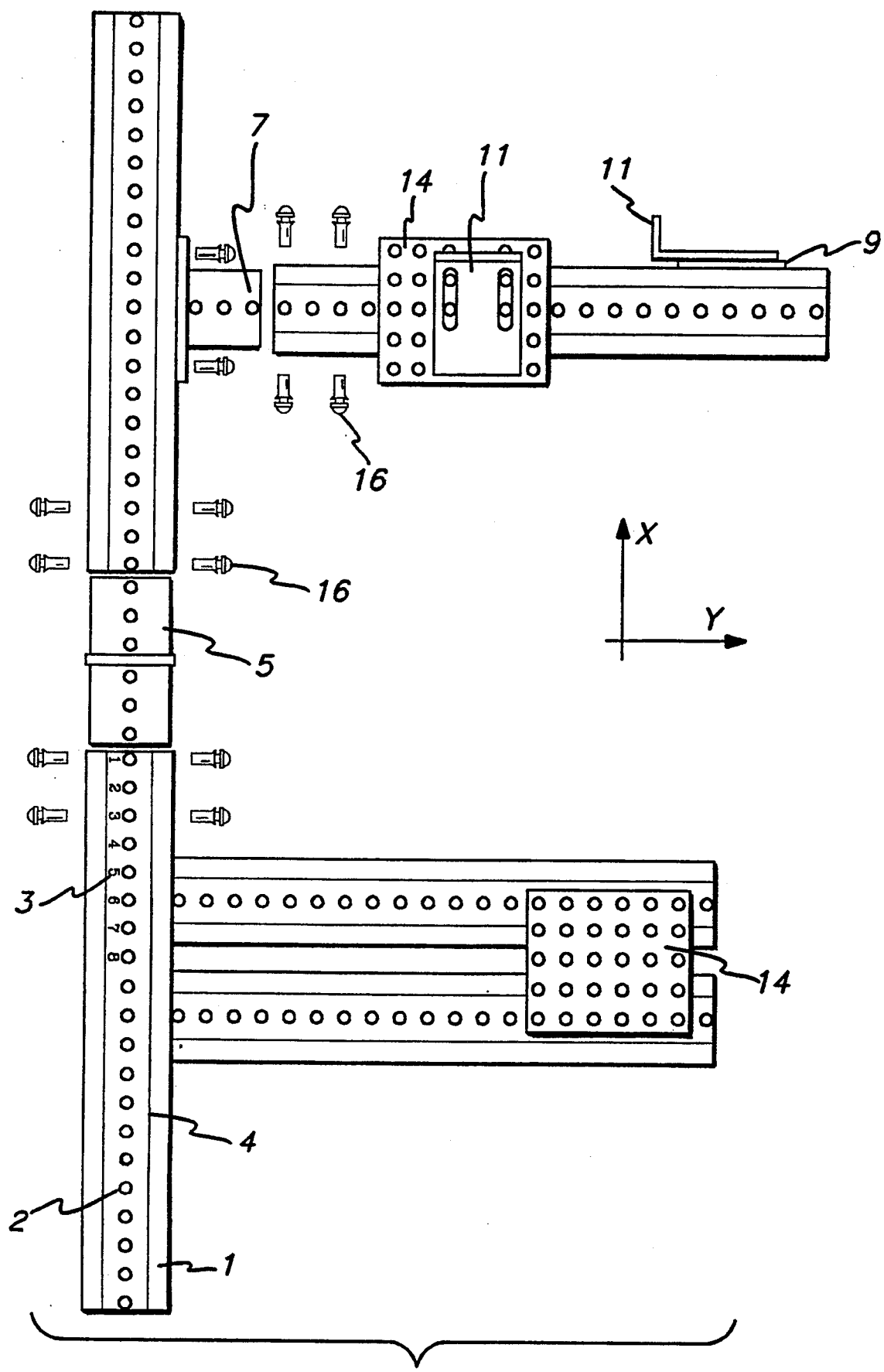
Figure 2:
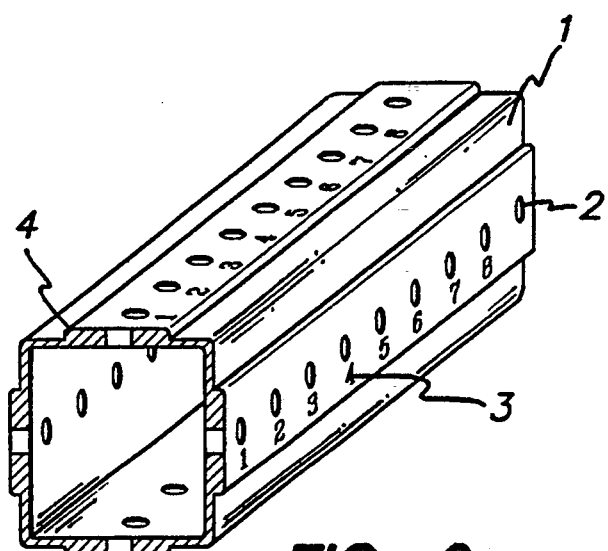
Figure 3:
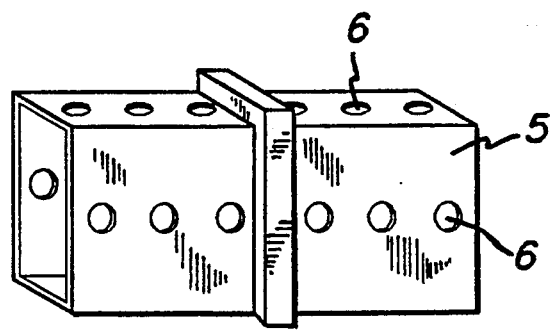
Figure 4:
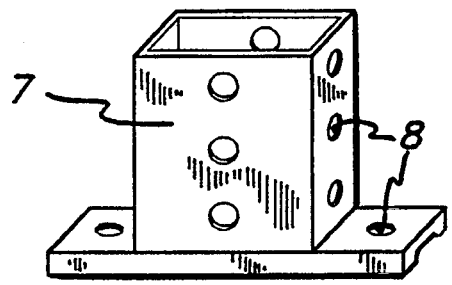
Figure 5:
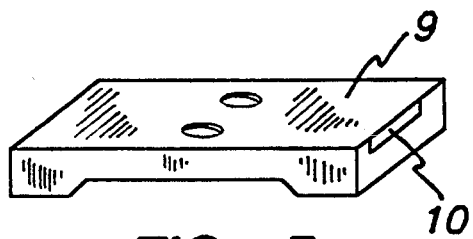
Figure 6:
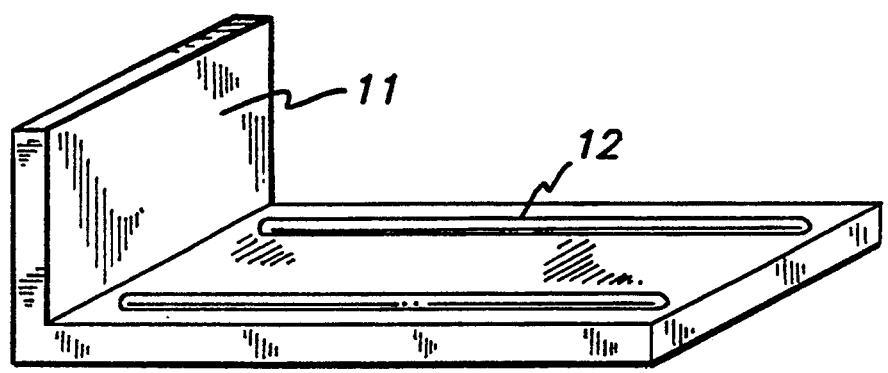
Figure 7:
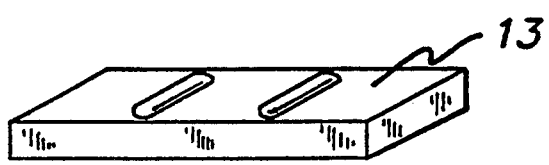
FIG. 7 illustrates a third fixture means 13 intended to serve as a support or attachment for further fixture means and for stepless or infinitely variable adjustment, in the manner described in connection with the second fixture means 11, by being provided with slits.
Figure 8:
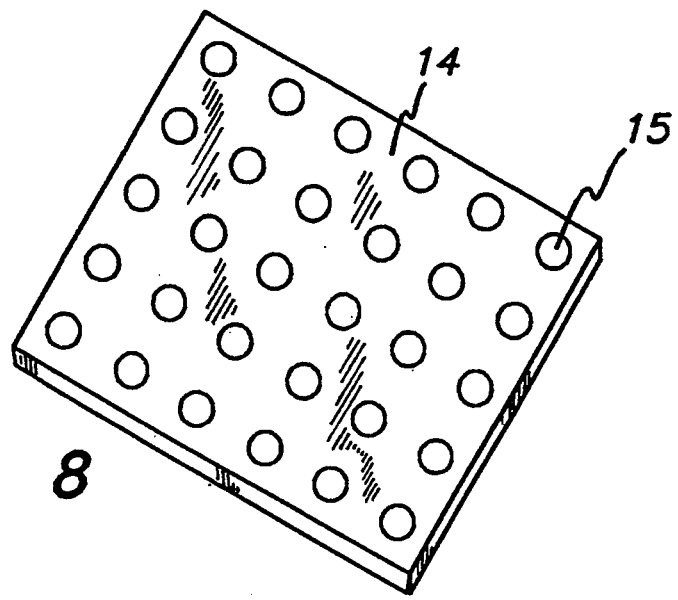
FIG. 8 illustrates a bridging plate 14 with its hole system 15, said bridging plate being intended to provide attachment or support surfaces for fixture means, as indicated in FIG. 1.
Figure 9:
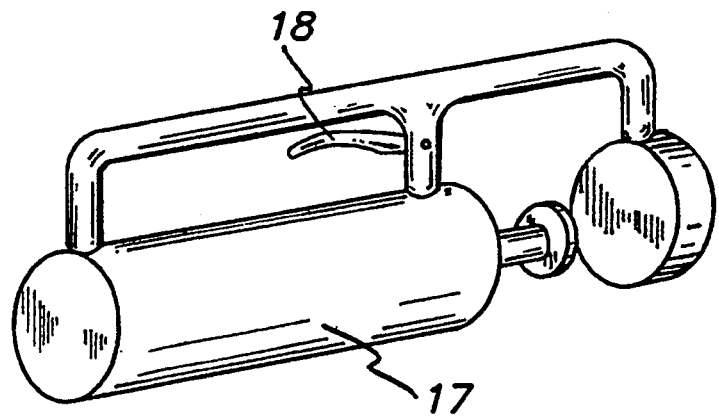

Finally, FIG. 9 illustrates a clamping unit 17 intended for clamping details to be assembled, preferably by welding, to fixture means, whereby the clamping unit 17 comprises a compressed air container 17 attached to a support in turn accommodating a control handle 18 for activating the clamping unit 17.

The above described method and fixture system according to the invention make possible the achievement of all of the objects of the invention, as discussed above, and specifically they bring about the following advantages:

The fixture system covers a complete program of products.
A significantly lowered cost for constructing and building up a fixture.
Shorter set-up times.
No manufacturing of prototypes necessary for constructing the fixture.
Increased quality/less cassation.
Lower costs for fixture storage.
Less capital binding.
Improved working environment.
Improved recruiting possibilities.
Greatly increased flexibility.
Facilitates carrying out changes in product shape.

All of these advantages and other achieved by means of the present invention are of great importance within this field and greatly affect the competitiveness of companies involved.

Although the invention has been specifically described and illustrated herein with respect to a particular embodiment thereof, it should be readily apparent to those skilled in the art that various modifications, alterations and variations can be made without departing from the scope of the invention as defined by the appended claims.

We claim:

1. A fixture system for the positioning and clamping of details to be assembled, characterized by selectively interconnectable standard fixture components (1, 5, 7, 14) provided with hole systems (2, 6, 8, 15) where the holes are provided in exact positions with predetermined pitch, tile standard fixture components being interconnectable in predetermined exact positions in the longitudinal, transversal and vertical direction with the hole systems (2, 6, 8) selectively extendable along the X-, Y- and/or Z-axis of a coordinate system, all of the holes of the hole systems having specified positions in tile coordinate system, said fixture system comprising a computer for storing drawing information regarding a product, for storing fixture standard component data and fixture means data and for establishing an installation plan for the specific fixture to be built in each case, based on the stored drawing information and the fixture component data.

2. A fixture system according to claim 1, characterized in that the standard fixture components consist of basic beams (1) interconnectable in the longitudinal, transversal and vertical direction by means of jointing means (5) and connecting means (7) and in that fixture means (9, 11, 13), and bridging plates (14) are connectable to the basic beams (1) in predetermined exact positions in the hole system of the basic beams (1).

3. A fixture system according to claim 1, characterized in that all sides of basic beams (1) form positioning and clamping surfaces and are provided with holes in one or several aligned rows.

4. A fixture system according to claim 1, characterized in that the standard fixture components (1, 5, 7) are interconnectable and that the fixture means (9, 11) and bridging plates (14) are attachable by means of expandable clamping means (16) in the shape of expansion-shell bolts.

5. A fixture system according to claim 1, characterized in that a first fixture means (9) is optionally positionable on the basic beams (1) or bridging plates (14), in exact position in the hole system (2, 15).and in that a second fixture means (11) is connectable to and supportable on the first fixture means (9).

6. A fixture system according to claim 1, characterized in that the second fixture means (11) is provided with slits (12) allowing for a stepless movement in one direction and in that the first fixture means (9) is provided with a scale (10) for reading the position of the second fixture means (11) relative thereto.

7. A fixture system according to claim 1, characterized in that the basic beams (1) are provided as electrically conducting beams.

8. A fixture system according to claim 2, characterized in that all sides of the basic beams (1) form positioning and clamping surfaces and are provided with holes in one or several aligned rows.

9. A fixture system according to claim 2, characterized in that the standard fixture components (1, 5, 7) are interconnectable and that the fixture means (9, 11) and bridging plates (14) are attachable by means of expandable clamping means (16) in the shape of expansion-shell bolts.

10. A fixture system according to claim 3, characterized in that a first fixture means (9) is optionally positionable on the basic beams (1) or bridging plates (14), in exact position in the hole system (2, 15) and in that a second fixture means (11) is connectable to and supportable on the first fixture means (9).

11. A fixture system according to claim 4, characterized in that a first fixture means (9) is optionally positionable on the basic beams (1) or bridging plates (14), in exact position in the hole system (2, 15) and in that a second fixture means (11) is connectable to and supportable on the first fixture means (9).

12. A fixture system according to claim 4, characterized in that the second fixture means (11) is provided with slits (12) allowing for a stepless movement in one direction and in that the first fixture means (9) is provided with a scale (10) for reading the position of the second fixture means (11) relative thereto.

13. A fixture system according to claim 5, characterized in that the second fixture means (11) is provided with slits (12) allowing for a stepless movement in one direction and in that the first fixture means (9) is provided with a scale (10) for reading the position of the second fixture means (11) relative thereto.

14. A fixture system according to claim 4, characterized in that the basic beams (1) are provided as electrically conducting beams.

15. A fixture system according to claim 6, characterized in that the basic beams (1) are provided as electrically conducting beams.

16. A fixture system according to claim 2, characterized in that all sides of the basic beams (1) form positioning and clamping surfaces and are provided with one row of holes.

17. A welding fixture system for the positioning and clamping of details to be assembled through welding, characterized by selectively interconnectable standard fixture components (1, 5, 7, 14) provided with hole systems (2, 6, 8, 25) where the holes are provided in exact positions with predetermined pitch, the standard fixture components being interconnectable in predetermined exact positions in the longitudinal, transversal and vertical direction with the hole systems (2, 6, 8) selectively extendable along the X-, Y-and/or Z-axis of a coordinate system, all of the holes of the hole systems having specified positions in the coordinate system, said welding fixture system comprising a computer for storing drawing information regarding a product, for storing fixture standard component data and fixture means data and for establishing an installation plan for the specific fixture to be built in each case, based on the stored drawing information and the fixture component data.

18. A method for providing a fixture for the positioning and clamping of details to be assembled, comprising the steps of storing in a computer drawing information regarding a product, fixture standard component data and fixture means data; establishing a zero position on the product; providing an installation plan for the specific fixture to be built through determining, based on the stored drawing information and the fixture component data, support positions for the fixture relative to the product, in a system of coordinates and starting from the zero position on the product; and building up a fixture according to the installation plan, from standard fixture components selectively interconnectable by means of a hole system extendable in the direction of the X-, Y- and/or Z-axis of the system of coordinates.

19. A method according to claim 1, characterized by providing drawing information in a CAD computer program, by storing all fixture standard components in the CAD computer program and by establishing the installation program for the fixture in a computer, based on the drawing information and fixture standard components stored therein.

* * * * *